United States Patent [19]

Bühner

[11] 3,756,570
[45] Sept. 4, 1973

[54] APPARATUS FOR CONTINUOUS DISPERSION AND HOMOGENIZATION OF PREDOMINANTLY VISCOUS SUBSTANCES

[76] Inventor: Willy Bühner, Schwachhauser Heerstrasse 114, 28 Bremen, Germany

[22] Filed: Sept. 29, 1971

[21] Appl. No.: 184,894

Related U.S. Application Data

[63] Continuation-in-part of Ser. No. 856,433, Sept. 9, 1969, abandoned.

[52] U.S. Cl. .......................... 259/6, 259/8, 259/105
[51] Int. Cl. ........................ B01f 13/10, B01f 7/26
[58] Field of Search ................. 259/6, 7, 8, 9, 10; 241/260, 296; 146/67, 68, 68 A

[56] References Cited
UNITED STATES PATENTS

| | | | |
|---|---|---|---|
| 2,572,049 | 10/1951 | Oakes | 259/8 X |
| 3,318,580 | 5/1967 | Simonetti | 259/8 |
| 3,430,925 | 3/1969 | Bühner | 259/8 |
| 352,135 | 11/1886 | Kinley | 241/296 X |
| 2,937,679 | 5/1960 | Dorfel | 146/67 |
| 2,548,332 | 4/1951 | Alexander et al. | 259/7 |
| 3,141,865 | 7/1964 | McEvoy | 259/8 X |

FOREIGN PATENTS OR APPLICATIONS

| | | | |
|---|---|---|---|
| 739,485 | 9/1943 | Germany | 259/8 |
| 524,321 | 5/1931 | Germany | 259/8 |
| 854,037 | 11/1960 | Great Britain | 259/9 |

Primary Examiner—John Petrakes
Assistant Examiner—Philip R. Coe
Attorney—Toren and McGeady

[57] ABSTRACT

The disclosed apparatus continuously disperses and homogenizes predominantly viscous substances and produces finished products, such as lacquers, in large or in small quantities. In the apparatus, feed pipes charge a lower rotor chamber with the starting materials. A rotor in the rotor chamber drives the materials upwardly into a mixing chamber formed by stacked annular bodies. Each annular body is composed of two body portions spaced from each other. Circular disks rotate in the spaces between the annular body portions to operate on the materials. The materials reach an upper plenum chamber where they are discharged through discharge pipes. The two body portions of each annular body are axially displaceable relative to each other. Suitable gears and motors displace the body portions relative to each other. Surrounding cylinder walls enclose the annular bodies. The gears project through the cylinder walls.

25 Claims, 9 Drawing Figures

PATENTED SEP 4 1973

APPARATUS FOR CONTINUOUS DISPERSION AND HOMOGENIZATION OF PREDOMINANTLY VISCOUS SUBSTANCES

REFERENCE TO COPENDING APPLICATIONS

This is a continuation-in-part of my copending application, Ser. No. 856,433, filed Sept. 9, 1969, and now abandoned.

BACKGROUND OF THE INVENTION

This invention relates to apparatuses for continuous dispersion and homogenization of predominantly viscous substances.

Such apparatuses attempt to obtain a distribution of polyphase systems and highly viscous substances which is as homogeneous as possible and whose output has properties which are as uniform as possible. Homogenizing, dispersing and emulsifying machines, such as epicyclic agitators, centrifugal mixers, gear and kneading pumps of the most widely varying kinds have been used for this purpose. Double-armed kneading machines and multirolling mechanisms have been developed for mixing highly viscous substances Use has been made of slow-running agitator mills with small grinding bodies or high-speed mills for refining ground material. However, a sufficient degree of homogenization is frequently obtained only after running such machines for several hours.

Ball mills can considerably reduce the time taken for grinding. A high speed agitator mill which works with sand and is commercially known as a "sand mill" has been developed for fine-grinding pigments in film forming products. The best-known of these agitator mills is provided with removal troughs and a section member stand which takes the drive shaft and the drive motor. In another device of this type the agitator bears are arranged stationary and have removable bottoms to change the beads for color. These known agitator mills are of compact construction. However, these mills are not suitable for the production of products such as clear lacquers.

The known apparatuses for dispersing, fine grinding, or homogenizing operate discontinuously. Apparatus such as kneading pumps which are also suitable for continuous operation are practical only for mixing or thoroughly kneading certain substances. Moreover, in all known apparatuses sufficient mixing or homogenization of the starting material or starting materials is possible only if these materials pass through a long mixing area. As a result such apparatuses are relatively large and their installation takes up considerable space. If they are made more compact the materials must pass through one and the same apparatus many times. Such multiple passage through one mixing apparatus, or the homogenizing or dispersing of materials in an apparatus for a long period of time is uneconomical and involves high costs. Furthermore, the duration time for various mixing steps in the apparatus must be taken into consideration and these are variable from product to product and also depend on the purpose to which the dispersed materials are to be put. Long operating durations prevent the use of the apparatus for other mixing purposes. Special planning is necessary if a sufficient number of suitable machines are not available.

An object of this invention is to avoid the above mentioned difficulties.

Another object of this invention is to increase the dispersion and homogenization of the starting materials used.

SUMMARY OF THE INVENTION

According to a feature of this invention, these objects are achieved by mixing the starting materials with circular disks that are rotated within flat cylindrical grooves or spacings each formed in one of a plurality of annular bodies stacked one upon the other and detachably connected to each other. Each body is formed of a pair of body portions between which the grooves are formed. The body portions are movably relative to each other to vary the size of the grooves axially. The disks are mounted on a common rotating drive shaft and axially spaced from each other. The disks fit into the variably sized grooves formed by the body portions. The mixing chamber defines a lower rotor chamber and an upper plenum chamber located above the rotor chamber. The rotor chamber includes the spacings or grooves between the body portion in the region of the rotating circular disks. The mixing chamber is provided with feed pipes for the starting materials used. The feed pipes open into the mixing chamber in the region of the chamber floor. The mixing chamber is further provided with an upper discharge pipe for the dispersion product.

According to the present invention the rotor chamber is provided with solid walls in its upper portion. The upper portion comprises a central longitudinal bore for passing a drive shaft of an agitator means which includes rotating disks. The longitudinal bore is of a somewhat larger diameter than the diameter of the drive shaft and the upper portion of the rotor shaft comprises the cylindrical or annular grooves communicating with the longitudinal bore so that the number of annular or cylindrical grooves corresponds to the number of rotating disks and the annular grooves are adapted to receive the rotating disks.

Each annular body of this plurality of annular bodies that forms the annular grooves in which the disks rotate with the materials is, as stated, composed of two disk-shaped annular body portions. The grooves form part of the rotor chamber. Each body portion is provided with a central opening for passing the agitator drive shaft, that is to say the drive shaft for the rotating disks. Each body portion has a rim bead formed integrally therewith. Each rim bead extends from the outer periphery of each body portion, axially toward the other body portion of each annular body. It thus opposes the outer disk surfaces. This rim bead is of a square or rectangular cross-section so that the two facing rim beads of the opposing annular body portions serve to mutually space these body portions in forming the annular groove.

According to another feature of the invention the mutual spacing of the two annular body portions of an annular body defining an annular groove is varied by displacing each body portion relative to the other in the longitudinal direction of the mixing chamber. The spacing varies the axial size of each groove to achieve the maximum dispersion and homogenization. Suitable gears are provided to move each body portion axially relative to the other. Of course, each body portion that is moved requires other body portions also to be moved relative to the others since the annular bodies are stacked relative to each other.

According to another feature of the invention an overall sleeve or outer wall surrounds the annular bodies to prevent leakage of material from between the body portions when the axial size of the grooves are changed. Suitable gear mechanisms extend through the outer wall or sleeve to accommodate axial movement of the body portion.

According to another feature of the invention the surface of the disk shaped annular bodies facing the rotating disks are provided with profilings. Similarly, the rotating disks may also be provided with profilings.

According to another feature of the invention a propeller agitator below the circular disk agitator in the region of the feed pipe openings drives the starting materials toward the annular bodies. According to another feature of the invention a high speed vane agitator takes the place of the propeller agitator. The vane agitator includes active edges arranged approximately vertically and disposed in the region of the feed pipe openings.

The apparatus according to the invention generally comprises a mixing chamber formed of a plurality of annular bodies arranged one upon the other and detachably connected with each other and containing therein a rotating agitator. The mixing chamber defines a lower rotor chamber and an upper plenum chamber located above the rotor chamber. The mixing chamber is provided with feed pipes to supply the starting materials used. The feed pipes open into the mixing chamber in the region of the chamber floor. The mixing chamber is further provided with an upper discharge pipe for discharging the dispersion product.

These and other features of the invention are pointed out in the claims. Other objects and advantages of the invention will become obvious from the following detailed description when read in light of the accompanying drawings.

DESCRIPTION OF PREFERRED EMBODIMENTS

FIGS. 1 to 8 illustrate the details of the invention. A general conception of the invention can be had by referring first to FIG. 8 which is described here only generally and is referred to later for more detail.

Figure 8:
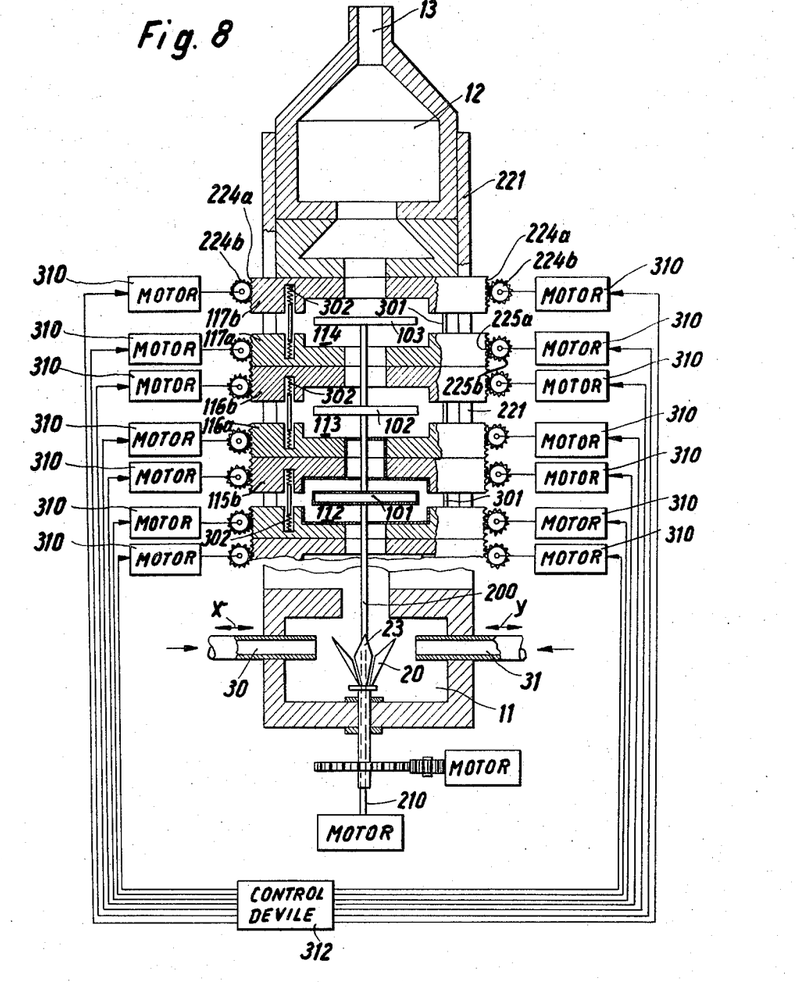
FIG. 8 is a partly sectional partly schematic elevation of an apparatus embodying features of the invention.

In FIG. 8, feed pipes 30 and 31 pass starting materials into the lower portion of a mixing chamber. A vane agitator 20 drives the materials into circular grooves 112, 113, 114, etc. of axially arranged annular bodies 115, 116, 117, etc. In the grooves 112, 113, and 114, agitating disks 101, 102 and 103 rotating on a shaft 210 mix the materials. The materials then arrive in an upper plenum chamber 12. There a discharge pipe 13 leads off the mixed materials. Each body, 115, 116, 117 etc. is composed of two body portions 115a and 115b, 116a and 116b, 117a and 117b, etc. In order to maximize the effectiveness of the process the size of the groove is changed in the axial direction by moving the body portions 115a, 116a, 117a, etc. toward or away from the respective body portions 115b, 116b, and 117b, etc. For this purpose each of the body portions includes a pair of vertical racks 224a or 225a that extend radially through slits in a cylindrical jacket or wall 221 surrounding the annular bodies. Respective gears 224b and 225b, rotated by motors 310, engage the racks 224a and 225b. A control device 312 constrains the motors 310 and the gears to move the body portions up and down relative to each other and thereby increase and decrease the axial size of the grooves.

Suitable cylindrical gap seals 301 supported by springs 302 within cylindrical recesses in the body portions maintain the materials within the body portions. The surrounding jacket 221 also accomplishes this function.

Figure 1:
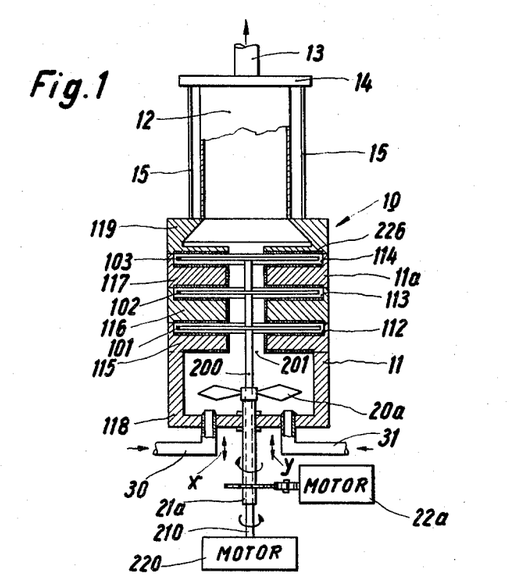
FIG. 1 is a partly sectional partly schematic elevation illustrating a mixing chamber embodying features of the invention and including a circular disk agitator and a propeller agitator.
Figure 2:
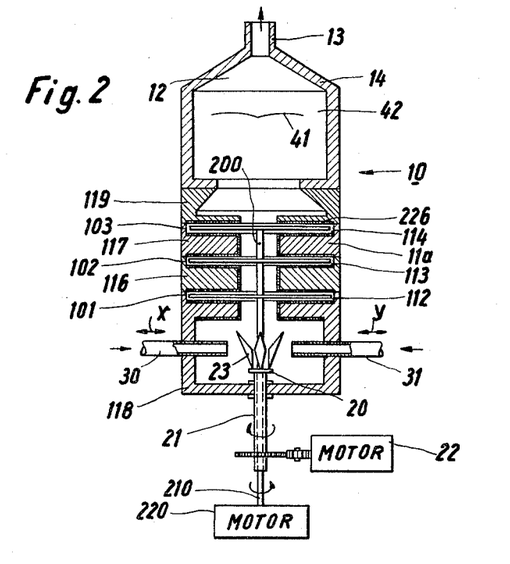
FIG. 2 is a partly sectional partly schematic elevation illustrating another mixing apparatus embodying features of the invention and utilizing a vane agitator with active edges arranged below the circular disk agitator.

In the embodiment of the invention shown in FIG. 1 an approximately cylindrical mixing chamber 10 forms an enlarged rotor chamber 11 and an upper narrow plenum chamber 12 to which a discharge pipe 13 is attached. It should be recognized that in all these Figures like parts are designated with like reference numerals. The mixing chamber 10 preferably has its housing constructed of corrosion resistant materials. The plenum chamber 12 is formed by an inspection glass which is held in an upper ring 14 which in turn is fastened by means of a connecting rod to the walls of the rotor chamber 11. Several inspection glasses may also be provided in the wall of the chamber 11. In the embodiment of FIG. 2 the walls of the plenum chamber 12 are directly mounted on the walls of the mixing chamber 11 and have approximately the same diameter as the walls of the chamber. The rotor chamber 11 has a volumetric capacity of about 300 cubic centimeters to about 5 litres. A circular-disk agitator 200 is centrally arranged in the rotor chamber 11. The circular disk agitator 200 includes a vertical agitator drive shaft 210 which is connected to a drive motor 220 and which supports three mutually spaced rotating disks 101, 102, and 103 that are mounted on the drive shaft 210. The rotational speed of the drive motor 220 is continuously adjustable in a range of from 5,000 to 50,000 RPM.

The rotor chamber 11 communicates with feed pipes 30 and 31. The number of feed pipes depends upon the number of starting materials which form the basis of the finished product. The feed pipes 30 and 31 extend to the point of direct inpingement on the circular disk agitator 200, right into the interior of the rotor chamber 11. The free ends of the feed pipes 30 and 31 are preferably nozzle-shaped. In order to be able to vary the distance of the nozzle-shaped ends of the feed pipes 30 and 31 from the circular disk agitator 200, the feed pipes 30 and 31 are telescopically guided in the wall of the rotor chamber 11 as shown by the arrows $x$ and $y$. The feed pipes 30 and 31 are connected via metering pumps which supply containers for the starting materials.

All of the rotating disks 101, 102, and 103 of the circular disk agitator 200 may be of similar diameters. Annular grooves 112, 113, 114, etc. in the interior wall of the rotor chamber 11 receive the rotating disks 101, 102 and 103. The depth of the annular grooves 112, 113 and 114 practically corresponds to the diameter of the rotating disks 101, 102 and 103. The upper portion of the rotor chamber is formed by solid walls with a central longitudinal bore 201 for the drive shaft 210 of the agitator 200 provided with the rotating disks 101, 102 and 103. The annular grooves 112, 113 and 114 which receive the rotating disks 101, 102, and 103 in the solid wall upper portion of the rotor chamber 11 correspond in number to the rotating disks 101, 102 and 103. The dimension of the diameter of the longitudinal bore is somewhat larger than the diameter of the agitator drive shaft 210.

In order to be able to vary the number of disks 101, 102 and 103 the rotor chamber 11 is composed of several annular bodies 115, 116 and 117 which are detachably interconnected. The bottom portion of the rotor chamber 11 receiving the feed lines or pipes 30 and 31 and the upper chamber closure may also be arranged as annular bodies 118 and 119. All of the annular bodies 115, 116, 117, 118 and 119 are provided with through bores allowing interconnection of the annular bodies by means of fastening screws or the like. Sealing rings may be interposed between each pair of adjacent annular bodies to improve the sealing between them. A ring-shaped recess at the upper side of each annular body receives the rotating disks so as to define the annular grooves. If an additional annular body is now put on top of an annular body of this type the bottom surface of this additional annular body defines the upper limit of the ring-shaped recess so as to form an annular groove.

The individual annular bodies making up the rotor chamber 11, by being of the type above, make it possible to arrange several annular bodies provided with recesses or annular grooves one upon the other. This forms a number of annular grooves corresponding to the number of rotating disks utilized in any particular case.

Figure 3:
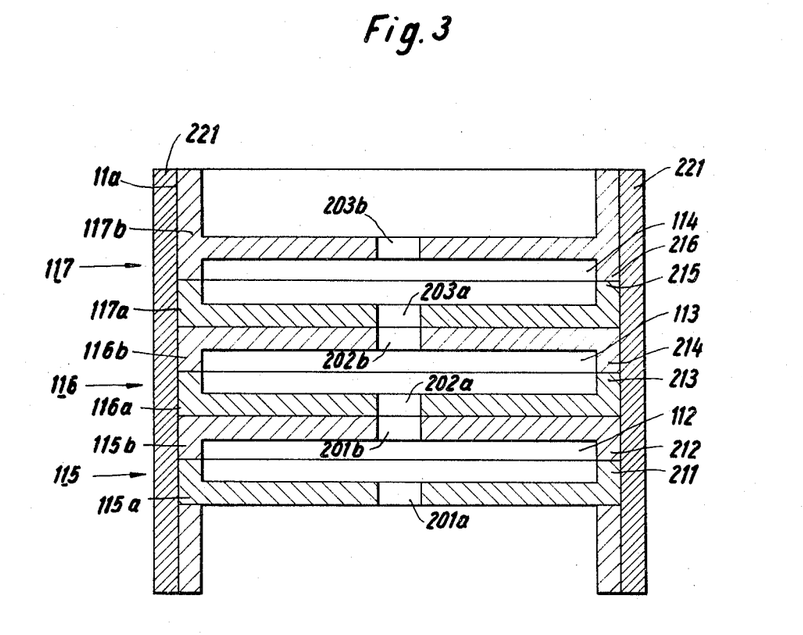
FIG. 3 is a sectional detail of the mixing chambers in FIGS. 1 and 2 and illustrating several of the annular bodies having annular grooves for receiving the rotating disks of the circular disk agitator in FIGS. 1 and 2.

Apart from the possibility of adapting the number of annular grooves to the number of rotating disks utilized in any particular case the size of the individual annular grooves may also be varied. This is accomplished according to another embodiment of the invention. This is shown in the detail of FIG. 3. According to FIG. 3 each of the annular bodies 115, 116 and 117 which define the annular grooves 112, 113 and 114 in the region of the rotating disks 101, 102 and 103, and form the rotor chamber 11, includes two disk-shaped annular body portions. The body 115 is composed of body portions 115a and 115b. The body 116 is composed of body portions 116a and 116b. The body 117 is composed of body portions 117a and 117b. The body portions 115a, 115b, 116a, 116b, 117a, and 117b define respective central openings 201a, 201b, 202a, 202b, 203a, and 203b for passing the agitator drive shaft 210. The size of the central openings are selected so that the rotation of the drive shaft 210 is not impeded. Rim beads 212, 213, 214, 215, and 216 which have a square cross section or a rectangular profile, are formed integrally with the annular body portion adjacent to the outer peripheries of these annular bodies 115, 116 and 117 at the opposing disk surfaces of the disk shaped annular body portions 115a, 115b, 116a, and 116b, 117a, and 117b.

The minimum spacing between each pair of disk-shaped annular bodies 115a and 115b, 116a and 116b, and 117a and 117b is defined in each case by the two opposing rim beads 211 and 212, 213 and 214, and 215 and 216 respectively. They thus form the annular grooves 112, 113 and 114.

Figure 4:
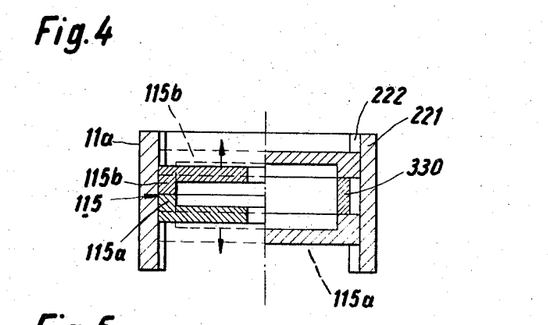
FIG. 4 is a vertical sectional detail of an annular body in FIGS. 1, 2 and 3 composed of two disk-shaped annular body portions, showing various positions of the annular body portions.
Figure 6:
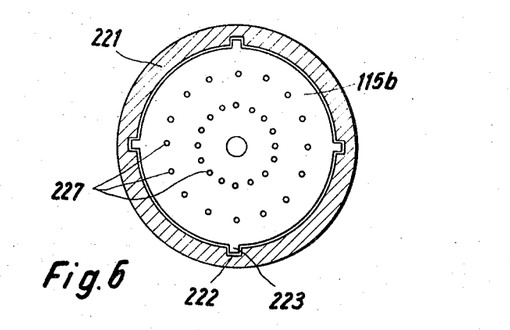
FIG. 6 is a top view of an annular body in FIGS. 1 to 5.

To vary the height of the annular grooves the annular body portions 115a, 115b, 116a, 116b, 117a and 117b are adjustably mounted for movement in the longitudinal direction of the mixing chamber within a surrounding cylindrical jacket 221. They are guided by means of longitudinal grooves 222 provided in the interior wall of the outer jacket 221. These engage mating profiles 223 provided at the outer peripheries of the annular bodies 115, 116 and 117 as shown in FIGS. 4 and 6.

This constitutes one embodiment of the invention. The body portions may be moved manually. They may be held in place relative to each other by interference fits. According to one embodiment of the invention, they are held in place by rings, placed between the body portions such as 115a and 115b, having outer diameters equal to those of the body portions. Two positions of the body portions 115a and 115b appear in FIG. 4 on the left and right. A ring 330 for separating the portions appears in FIG. 4.

According to another embodiment of the invention, annular body portions 115a and 115b, 116a and 116b, or 117a and 117b defining the annular grooves 112, 113, and 114, are slidably adjusted in opposite directions in the outer jacket 221 by means of gear drives 224 and 225. The latter are connected to control device 312 in order to vary the size of the annular grooves. Each disk-shaped annular body portion of the annular bodies 115, 116 and 117 includes at least two opposing gear racks 224a and 225a respectively which are vertically disposed and mutually spaced on the periphery of the annular body. The gear racks 224a and 225a engage adjusting gears 224b and 225b respectively. These gears or pinions are rotationally mounted at or on the outer jacket and provided with markings to indicate the adjusted size of the annular groove. The movements of the adjusting gears 224b and 225b respectively are coupled so that the mutual spacing of the two disk-shaped annular body portions 115a and 115b, 116a and 116b, or 117a and 117b of each of the annular bodies 115, 116 and 117, defining the annular grooves 112, 113 and 114 respectively, may be simultaneously adjusted.

Figure 5:
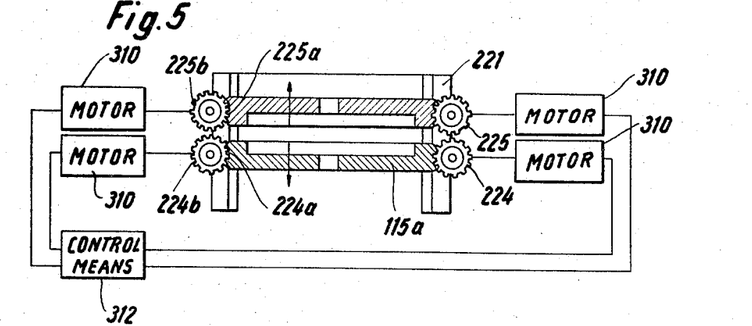
FIG. 5 is a detailed elevation of a portion of the mixing chamber in FIGS. 1 to 4 and embodying an additional feature of the invention for varying the mutual spacing of the body portions.

The gear drives 224 and 225 for adjusting the disk-shaped annular body portions of the annular bodies 115, 116 and 117 are arranged so that simultaneous adjustment of all disk-shaped annular body portions is possible. This is effected by displacing the annular body portion 115a by means of the lowermost adjusting gear 224a associated with this body portion 115a upwardly until the adjusting gear 225b engages the tooth rack 224a of the annular body portion 115a, after the annular body portion 115b of the same annular body disposed above the disk-shaped annular body portion 115a, as well as all of the annular body portions of the other annular bodies disposed above the same annular body have already been moved upwardly as shown in FIG. 5. In this manner it is possible to vary the position of all annular bodies and the positions of the individual disk-shaped annular body portions of all annular bodies simultaneously.

Figure 6A:
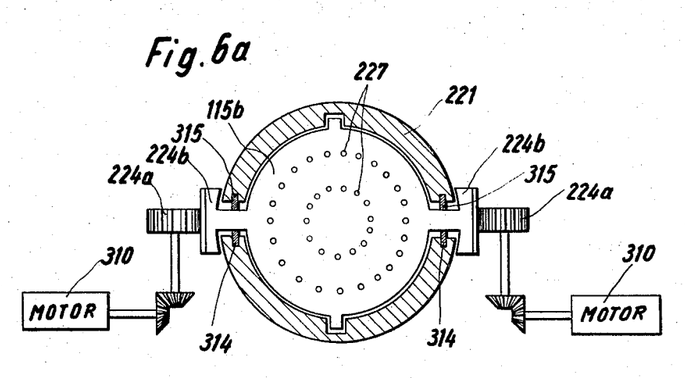
FIG. 6a is a top view of the drive arrangement in FIG. 5.
Figure 7:
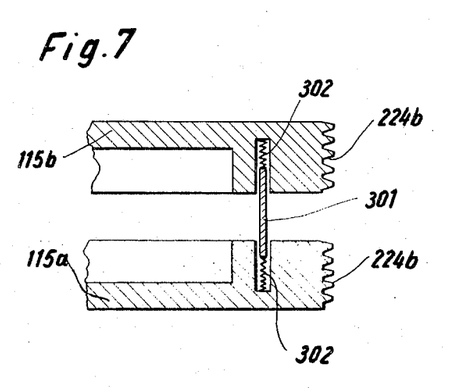
FIG. 7 is a sectional detail of FIG. 5.

In FIG. 5 motors 310 drive pinion gears 224a and 225a which in turn drive racks 224b and 225b on the basis of a control drive 312. The latter may be manual or automatic. The engagement between the gears 224a and 225a and the racks 224b and 225b may be accomplished two ways one of which is shown in FIG. 6a. In this one embodiment the racks project through slots 314 in the jacket 221. In the other embodiment, shown in FIG. 5, the racks are formed directly at the periphery of the body portion and the gears enter the slots in the jacket 221 to engage the racks. Suitable sealing means 315 prevent escape of the materials from the mixing chamber. FIGS. 5 and 6a are otherwise identical.

For increasing the efficiency, the surfaces of the disk-shaped body portions 115a, 115b, 116a, 116b, 117a, and 117b and the surfaces rotating disks 101, 102 and 103 facing each other are, according to an embodiment of the invention, provided with serrations or profilings 226 which may be bicurved or saw tooth. The profilings or serrations are shown specifically in FIGS. 2 and 8. For clarity the showing is only partial.

According to a preferred embodiment of the invention, a bearing at each end of the drive shaft 210 of the circular disk agitator 200 mounts the drive shaft 10 to preclude vibrations. In this case the bearing of the upper drive shaft is arranged in the central opening 203b of the uppermost disk-shaped annular body portion 117b of the annular body 117.

For decanting the dispersion product, perforations 227 are provided in the annular body portion 117b and the size of these perforations 227 is selected such that an unimpeded passage of the dispersion product is assured. Moreover, all of the disk-shaped annular body portions of the annular bodies 115, 116 and 117 are provided with passage perforations according to an embodiment of the invention and as shown in FIGS. 6 and 6a.

According to a feature of the invention illustrated in FIG. 1 a propeller agitator 20a is arranged below the circular disk agitator 200 and in the region of the openings of the feed pipes 30 and 31 in order to make it possible to readily homogenize and disperse highly viscous substances within a minimum time period. The drive shaft 21a of the propeller agitator 20a includes a hollow shaft for receiving the drive shaft 210 of the circular disk agitator 200. The drive means for the propeller agitator 20a is indicated by the reference numeral 22a. This embodiment, the feed pipes 30 and 31 are connected with the bottom wall of the rotor chamber 11.

In accordance with a further embodiment of the invention, a vane agitator 20 is arranged below the circular disk agitator 200. This vane agitator is a high speed agitator. The active edges of the vanes 23 are directed approximately parallel to the axis of the agitator and have the form of cutting edges. According to another embodiment of the invention two vane agitators are arranged within the rotor chamber 11. In this case the axes of the two vane agitators are perpendicularly arranged. At least two of the vane agitators may rotate in opposite directions. Additionally two vane agitators may be arranged opposite to each other. The axes of the two agitators being in alignment.

The propeller agitator 20a and the vane agitator 20 are each provided with drive means 20 or 22a respectively. These drive means are independent of the drive means 220 for the circular disk agitator 200. These two agitators 20 and 20a, and the agitator 200, may rotate in the same or the opposite rotational sense. The rates of revolution of the agitators may also be different.

According to another embodiment of the invention the mixing chamber 10 is provided with a cooling device at the outer or inner wall of the mixing chamber. This avoids heating of the starting materials during homogenization or dispersion. It is highly advantageous, however, if the starting materials are cooled immediately before introducing them into the center of turbulance of the agitator. Thus, according to another embodiment of the invention the cooling elements of the cooling device are also arranged at the outer walls of the portions of the feed pipes 30 and 31 which are disposed in the interior of the rotor chamber 11.

As shown in FIG. 2 a baffle or guide plate 41 is provided above the agitator 200. This increases the vorticity of the starting materials introduced into the chamber 11. The guide plate 41 is of such dimension that an annular clearance 42 is formed between the plate 41 and the wall of the rotor chamber 11 for leading off the mixed components into the outlet pipe 13. This guide plate may also be utilized in FIG. 8.

The device for carrying out the continuous mode of operation makes it possible to produce finished products, in particular lacquers, colored lacquers, and synthetic lacquers of the highest and consistent quality. In addition the starting materials can be very finely ground. High degrees of homogenization and dispersion are obtained.

The method of operation is not interrupted from the storage container for the starting materials, to the drawing off of the finished product. The continuous process works with air completely excluded. Crusty residues, for example, lacquers, are obviated. In this way rapid cleaning of the complete device is possible. The device does not need to be dismantled for cleaning. Cleaning agents are merely directed through the device. The rotor chamber 11 cleans itself with the vorticity of the actual cleaning agent. The device is cleaned in the shortest possible time so that there are no long interruptions in lacquer production.

The device according to the invention makes possible conversion, in the shortest possible time, from one kind of lacquer to another kind of lacquer. The end product produced in accordance with the continuous process are of consistent quality even when starting materials of different qualities are used. Such a difference is usually the case with the starting materials for production of synthetic resin lacquers. If for example a new lacquer is produced then laboratory tests are no longer necessary. Also small quantities, for example only kg., at the end product can be obtained, so that large additions are no long necessary. If tests with small additions are satisfactory, then large-scale production can always be undertaken. Also small quantities, for example 5 metric tons of a certain kind of lacquer can be produced as easily as large amounts of say, 50 metric tons and over.

The apparatus of FIG. 8 corresponds substantially to the apparatus of FIG. 2. Like numerals are used to designate like parts. However, FIG. 8 includes some details which are not included in FIG. 2 but are discussed as constituting embodiments of details in FIG. 2 and are shown in FIGS. 3, 5 and 6a. In effect then FIG. 8 represents a duplicate of one embodiment of FIG. 2. In FIG. 8 the feed pipes 30 and 31 feed the materials into the bottom of the mixing chamber 11. The agitator drives the materials upwardly where they are homogenized and dispersed in the grooves formed between body portions 115a and 115b, 116a and 116b, and 117a and 117b. The spring held sealing cylinders 301 riding in the cylindrical recesses near the peripheries of the body portions prevent the viscous materials from escaping from between the body portions at the grooves. The sizes of the grooves are adjusted by adjusting the drive 224 and 225 with the control motors 310 on the basis of the control device 312. The materials are driven into the plenum chamber and discharged in the discharge pipe. The surrounding jacket 221 holds the body portions axially.

In general manufacture of a product such as a synthetic lacquer by means of the dispersion apparatuses disclosed involves feeding 90 percent of the total product synthetic resins dissolved in a solvent through the feed pipe 30 into the rotor chamber 11. 10 percent of the total product paraffin dispersion are fed through the feed pipe 31 into the rotor chamber 11. The total amount of the starting materials supplied in each case amounts to about 200 cubic centimeters. The starting materials supplied under pressure by means of metering pumps are discharged by the nozzle-shaped openings of the feed pipes and meet violently in the center of turbulance the vane agitator and impinge on the agitator vane. The cutting edges of the vanes cause an additional splitting effect on the particles impinging upon each other.

The high speed agitator imparts a very powerful vorticity to the starting materials. At the same time an additional fine grinding of the particles and the dispersion of the starting materials is effected. The finished product present in the rotor chamber 11 is whirled into the plenum chamber 12 since the turbulence zone of the agitator extends up into the plenum chamber 12 of the mixing chamber 10. From the plenum chamber 12, the finished product is discharged through the discharge pipe 13 to a discharge station or a weighing station or both. During the further continuous feeding of the starting components the necessary relative metering proportion of the starting components for a desired finished product is maintained in each case. In accordance with the speed with which the starting materials are supplied to the mixing chamber 10 the finished product is discharged. In using the apparatus of the present invention it has been shown that there occurs no alteration in the relative metering proportion since the starting materials do not remain in the rotor chamber for a longer period. After the starting materials have been fed into the rotor chamber and after vorticity the discharge of the finished product follows immediately. The resulting finished product is of consistent quality with the same physical properties. This is of considerable importance in the production of lacquer, in particular of clear lacquer.

The capacity of the mixing chamber 10 with a volumetric capacity of 300 cubic centimeters allows the production of 2 metric tons of an end product per hour. However, if it is desired to increase the quantity of the end product then several dispersion apparatuses may be combined into a production unit.

Any openings in the jacket which might result in leaks may be sealed by hand prior to each operation. On the other hand such openings may be sufficiently small so that the leakage therethrough of the viscous materials is negligible.

According to one embodiment of the invention the position of the disks 101, 102 and 103 is adjusted in FIG. 8 by moving each disk along the shaft 210 with the body portion. That is to say, each disk is keyed to move axially along the shaft and yet turn with the shaft. The fit of the disk relative to the shaft is sufficiently tight to keep it in position once it has been moved to its axial position. The disk can be moved in one direction or the other by moving the body portion closest to it with a gear against the disk until the disk moves to its desired position. Then the body portion is retracted.

According to a feature of the invention the bodies 115, 116 and 117 in FIG. 8 are not attached to each other. Spaces are left between the respective bodies. The spaces are sufficiently large to allow for adjustment of the body portion about the respective disks.

What is claimed is:

1. An apparatus for mixing viscous substances, comprising a plurality of pairs of groove forming means, each pair of said groove forming means forming a flat disk-shaped groove between them and central openings so that said groove communicate with each other, jacket means surrounding said pairs of groove forming means for restraining radial movement of material in the grooves, a plurality of plate means each rotatable in one of the grooves, and agitator means for rotating said plate means and driving materials into said grooves, said groove forming means being adjustable relative to each other transverse to the plane of the disk-shaped grooves so as to vary the thicknesses of the grooves.

2. An apparatus as in claim 1, wherein said groove forming means and said jacket form a central chamber, an entry chamber surrounding the portion of said agitator means for receiving materials to be met and for guiding the materials toward said central chamber, and a plenum chamber at the end of the central chamber opposite to said entry chamber, exit means from said plenum chamber.

3. Apparatus as in claim 1, wherein control means engage said groove forming means to adjust the position of one of said groove forming means in each pair to the other of said groove forming means in the pair.

4. An apparatus as in claim 3, wherein said jacket means includes openings for permitting engagement of said groove forming means with said control means.

5. An apparatus as in claim 4, wherein said groove forming means include rack means extending transverse to the direction of the grooves, and wherein said control means includes gears engaging said rack means.

6. An apparatus for dispersion and homogenization of a predominantly viscous substance, comprising input chamber means, supply means for supplying the substance to said input chamber means, plenum chamber means spaced from said input chamber means, exit means for guiding material from said plenum chamber means, central chamber means located between said input chamber means and said plenum chamber means and communicating with each of said chamber means, disk means rotatable in one direction in said central chamber means and having an overall surface parallel to the direction of rotation, rotatable vortex forming means located in one of said chamber means and having blade means with surfaces angular relative to the direction of rotation of said vortex forming means, said input chamber means and said central chamber means being located so that said vortex forming means and said disk means coact in treating the substance, said central chamber means including a pair of annular bodies for forming an annular groove and an axial bore for communicating with said input chamber means and said plenum chamber means, said disk means having a disk extending along a plane into the groove and shaft means extending transverse to said disk for rotating it within its plane, said bodies having axially raised circumferential edges for forming opposing central recesses, and control means for varying the distances between the bodies so as to vary the size of the groove, said recesses forming part of the groove.

7. An apparatus as in claim 6, wherein said control means engage each of said bodies to move each of the bodies in opposite directions.

8. An apparatus as in claim 6, wherein said control means includes a rack on the circumference of each of said bodies and gear means engaging the rack on each of said bodies.

9. An apparatus as in claim 6, wherein said chamber means are vertically oriented relative to each other.

10. An apparatus as in claim 6, wherein said chamber means includes a plurality of pairs of bodies in adjacent relationship forming coaxial grooves, and wherein said disk means includes a plurality of disks parallel to each other and rotatable within respective planes and within respective ones of said grooves.

11. An apparatus for continuous dispersion and homogenization of predominantly viscous substances comprising a mixing chamber including a plurality of annular bodies arranged one upon the other and detachably connected with each other and containing therein a rotating agitator, said mixing chamber defining a lower rotor chamber and an upper plenum chamber located above said rotor chamber, feed pipes entering said rotor chamber for starting materials used, an upper discharge pipe emerging from said plenum chamber for a dispersion product, said rotor chamber including solid walls in the upper portion thereof, said upper portion comprising a central longitudinal bore for passing a drive shaft of an agitator means which includes rotating disks, said longitudinal bore having a larger diameter than the diameter of said drive shaft and said upper portion of said mixing chamber comprising a number of annular grooves communicating with said longitudinal bore whereby the number of said annular grooves corresponds to the number of rotating disks, and said annular grooves being adapted to receive said rotating disks, each annular body of said plurality of annular bodies forming said annular grooves disposed in the region of said rotating disks and forming said rotor chamber including two disk-shaped annular body portions, each of said two annular body portions having a central opening for passing said agitator drive shaft and a rim beam formed integrally with said body portion, said rim bead being disposed adjacent to the outer periphery of said body portions and forming opposing central recesses which together form said annular groove, the spacing between body portions being variable, and control means for varying the height of said annular grooves by means of longitudinal grooves provided in the interior wall of said outer jacket and engaging mating profiles provided on the outer circumference of said annular body portions.

12. An apparatus for continuous dispersion and homogenization of predominantly viscous substances comprising a mixing chamber including a plurality of annular bodies arranged one upon the other and detachably connected with each other and containing therein a rotating agitator, said mixing chamber defining a lower rotor chamber and an upper plenum chamber located above said rotor chamber, feed pipes entering said rotor chamber for starting materials use, an upper discharge pipe emerging from said plenum chamber for a dispersion product, said rotor chamber including solid walls in the upper portion thereof, said upper portion comprising a central longitudinal bore for passing a drive shaft of an agitator means which includes rotating disks, said longitudinal bore having a larger diameter than the diameter of said drive shaft and said upper portion of said mixing chamber comprising a number of annular grooves communicating with said longitudinal bore whereby the number of said annular grooves corresponds to the number of rotating disks, and said annular grooves being adapted to receive said rotating disks, each annular body of said plurality of annular bodies forming said annular grooves disposed in the region of said rotating disks and forming said rotor chamber including two disk-shaped annular body portions, each of said two annular body portions having a central opening for passing said agitator drive shaft and a rim bead formed integrally with said body portion, said rim bead being disposed adjacent to the outer periphery of said body portions and forming opposing central recesses which together form said annular groove, the spacing between body portions being variable, and said two disk-shaped annular body portions of every annular body defining an annular groove being adjustably mounted for producing a variation in size of said annular groove, said adjustable mounting comprising a gear drive, actuating and adjusting means for said gear drive.

13. An apparatus for continuous dispersion and homogenization of predominantly viscous substances comprising a mixing chamber including a plurality of annular bodies arranged one upon the other and detachably connected with each other and containing therein a rotating agitator, said mixing chamber defining a lower rotor chamber and an upper plenum chamber located above said rotor chamber, feed pipes entering said rotor chamber for starting materials used, an upper discharge pipe emerging from said plenum chamber for a dispersion product, said rotor chamber including solid walls in the upper portion thereof, said upper portion comprising a central longitudinal bore for passing a drive shaft of an agitator means which includes rotating disks, said longitudinal bore having a larger diameter than the diameter of said drive shaft and said upper portion of said mixing chamber comprising a number of annular grooves communicating with said longitudinal bore whereby the number of said annular grooves corresponds to the number of rotating disks, and said annular grooves being adapted to receive said rotating disks, each annular body of said plurality of annular bodies forming said annular grooves disposed in the region of said rotating disks and forming said rotor chamber including two disk-shaped annular body portions, each of said two annular body portions having a central opening for passing said agitator drive shaft and a rim bead formed integrally with said body portion, said rim bead being disposed adjacent to the outer periphery of said body portions and forming opposing central recesses which together form said annular groove, the spacing between body portions being variable, and said disk-shaped annular body portions of every annular body adapted to be variably spaced comprising at least two opposing gear racks vertically disposed and mutually spaced on the periphery of said annular bodies.

14. An apparatus as defined in claim 11, wherein the surfaces of said disk-shaped annular bodies facing said rotating disks are provided with profilings.

15. An apparatus as defined in claim 11, wherein the surfaces of said rotating disks of said agitator are provided with profilings.

16. An apparatus as defined in claim 11, wherein said rotating disks have flat surfaces and are serrated at their flat surfaces.

17. An apparatus as defined in claim 11, wherein the surfaces of said disk-shaped annular bodies facing said rotating disks, and the other surfaces of said rotating disks are provided with profilings respectively.

18. An apparatus as defined in claim 11, wherein a propeller agitator is disposed below said agitator means and in the region of said feed pipe openings, the drive shaft of said propeller agitator being a hollow shaft adapted to receive said drive shaft of said circular disk agitator.

19. An apparatus as defined in claim 18, wherein said agitator means includes a high speed vane agitator having approximately vertically arranged active edges disposed below said circular disk agitator, said active edges arranged in the region of said feed pipe openings.

20. An apparatus as defined in claim 18, wherein said agitator disposed below said circular disk agitator disposed below said circular disk agitator comprises drive means independent of the drive means for said circular disk agitator.

21. An apparatus as defined in claim 20, wherein said agitators rotate in the same sense.

22. An apparatus as defined in claim 20, wherein the sense of rotation of one agitator is opposite to the sense of rotation of the other agitator.

23. An apparatus as defined in claim 22, wherein a guide plate is arranged below said discharge pipe.

24. An apparatus as defined in claim 20, wherein the diameter of said central openings in said disk-shaped annular body portions is somewhat larger than the diameter of said circular disk agitator drive shaft.

25. An apparatus as defined in claim 20, wherein said disk-shaped annular body portions of said annular bodies are provided with perforations for passing a dispersion product.

* * * * *